A. G. SCHROEDER.
MECHANICAL MOVEMENT.
APPLICATION FILED NOV. 17, 1913.
1,147,896.
Patented July 27, 1915.
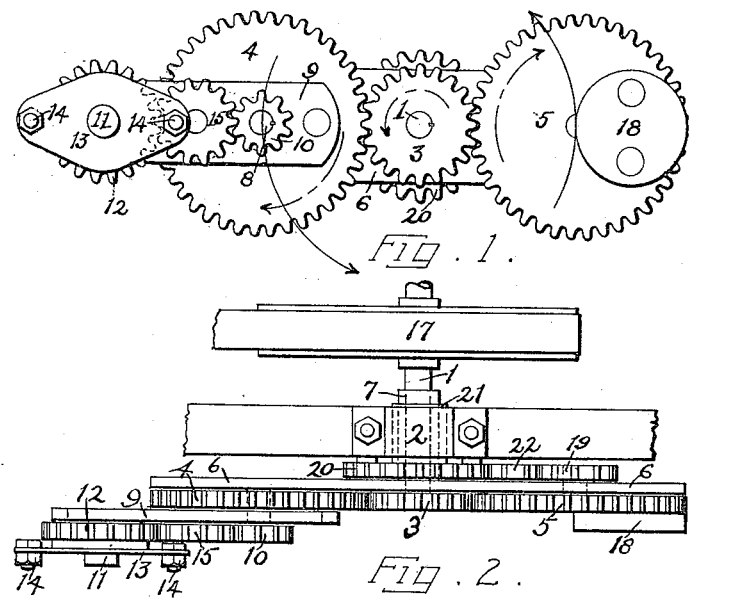
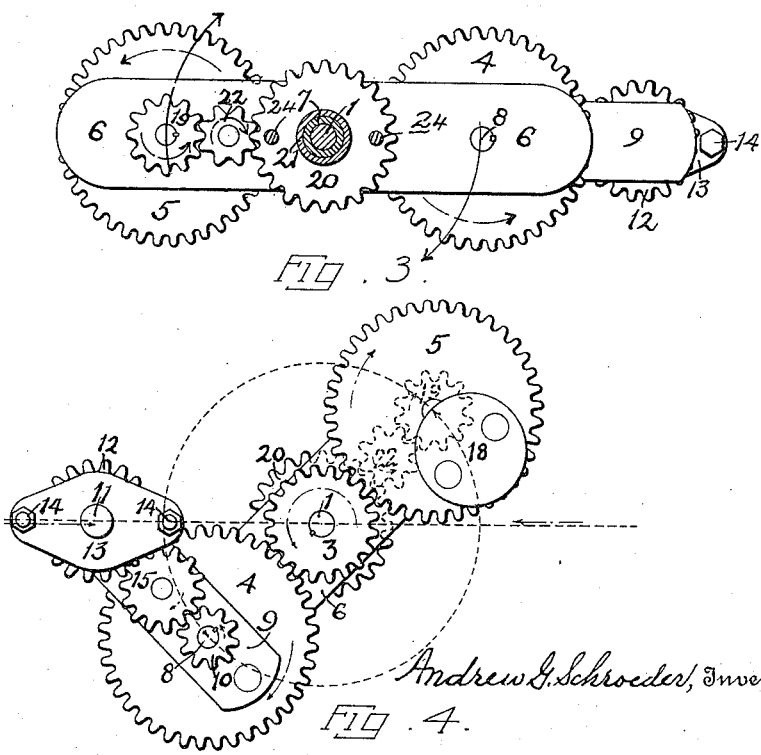
Witnesses
J. H. Hill
C. G. Richardson
Andrew G. Schroeder, Inventor
By Geo. W. Bullard,
Attorney

UNITED STATES PATENT OFFICE.

ANDREW G. SCHROEDER, OF MILTON, WASHINGTON.

MECHANICAL MOVEMENT.

1,147,896.　　　　　Specification of Letters Patent.　　Patented July 27, 1915.

Application filed November 17, 1913. Serial No. 801,389.

*To all whom it may concern:*

Be it known that I, ANDREW G. SCHROEDER, a citizen of the United States, residing at the town of Milton, in the county of Pierce and State of Washington, have invented certain new and useful Improvements in Mechanical Movements, of which the following is a specification.

My invention pertains to improvements in mechanical movements whereby a rotary motion is converted into a reciprocating motion and vice versa.

The objects of my invention are, first, to convert a high speed rotary motion into a powerful reciprocating motion that may be used to operate force pumps, drag saws and other mechanisms where a direct or oscillating reciprocating motion is required; second to convert a powerful direct reciprocating motion into a high speed rotary motion for various uses; and third to make it possible to omit the guides in developing a rotary motion from a direct reciprocating movement and vice versa. I attain these objects by means of the mechanism illustrated in the accompanying drawings in which—

Figure 1 is a front side elevation of one form of the mechanism and Fig. 2 is a top view of the same. Fig. 3 is a view of the reverse side of the mechanism; Fig. 4 a front side view similar to Fig. 1 showing the travel of the crank or wrist pin as the mechanism operates.

My invention comprises a system of gears mounted on a shaft 1 suitably mounted in a bearing or pillow block 2. On the end of shaft 1 is fixed a gear wheel 3, around which a pair of gears 4 and 5 intermeshing therewith are mounted and made to revolve. These gears 4 and 5 are mounted on a cross arm 6 which is centrally fixed to a sleeve 7 made to encircle the shaft 1 and revolve thereon within the pillow block 2, and within the sleeve 21 therein hereinafter described. This cross arm 6 need not be confined to the form shown, but may be a disk plate to carry the gears 4 and 5. The gear 4 is loosely mounted on a front stem or stud 8 fixed into the cross arm or disk 6 and turns thereon. This gear 4 has a crank arm 9 rigidly fixed thereon. A pinion gear 10 is fixed on the end of the stud 8 and revolves in a fixed position with the cross arm or disk 6. A crank or wrist pin 11 is set in outer end of the crank 9 and on it is loosely mounted a gear 12. To gear 12 is fixed a plate 13 to which a piston rod or other reciprocating shaft is designed to be attached to work on the wrist pin 11 by means of the bolts 14—14. An idler pinion 15 loosely mounted between pinion 10 and gear 12 and intermeshing therewith causes pinion 10 to so control gear 12 as to cause bolts 14—14 to stay in line with the center of the wrist pin 11 and the shaft 1. The length of the crank 9 and the combined action of the several gears is such that when shaft 1 and gear 3 mounted thereon is turned, the wrist pin 11 will travel back and forth in a straight line across the center of shaft 1 as indicated in Fig. 4.

When the shaft 1 is mounted in a vertical position and gear 3 is thereby turned in a horizontal plane, my mechanism as thus far described will operate perfectly. The shaft 1 being driven by a power operating the belt and pulley 17 will revolve gear 3 which intermeshing with 4 will not only cause the latter to turn but will cause the cross arm or disk to revolve around shaft 1 and the wrist pin 11 to travel in a straight line back and forth across the center of shaft 1. The gear 3 being one-half the size of gear 4, will make five revolutions to one forward and back motion of wrist pin 11. Gear 3 may be driven at a high speed and a slower and more powerful reciprocating motion be obtained in the wrist pin 11. The plate 13 being fastened to the reciprocating shaft to be attached thereto will travel forth and back in a direct line without guides over the center of shaft 1. The reverse action can be obtained by applying a powerful reciprocating motion to the wrist pin 11 by attaching a piston rod or other reciprocating power shaft thereto. The pin 11 will travel forth and back without guides over the center line of shaft 1 and cause gear 4 to turn on and revolve with the cross arm or disk 6 around gear 3 and develop a higher speed in the shaft 1.

When the shaft 1 is mounted in a horizontal position and the gear 3 is revolved in a vertical plane, the weight of the gear 4 and the crank 9 and the operating gears thereon will cause oscillation that will greatly interfere with its operation. To overcome this oscillation the oppositely mounted gear 5 has been added to counterbalance gear 4, and on gear 5 is fixed a weight 18 mounted relatively opposite the crank 9 so as to counterbalance it and the operating gears thereon. These oppositely added weights cause the mechanism to revolve smoothly without perceptible oscillation. With the improved mechanism thus balanced in construction, the piston or reciprocating shaft attached to the wrist pin 11 will operate the mechanism with a smooth rotary movement. When the operation is reversed by applying the power to the revolving shaft 1, the mechanism is revolved and the reciprocating piston or shaft is driven with equal smoothness.

In order to shift or fix the line of the reciprocating motion a combination of gears will be required in some uses of my invention. These are shown on the rear side of the cross arm or disk 6. The pinion 19 is fixed on the end of the rear stud or stem on which is mounted gear 5 and turns with it. Gear 20 is mounted on a sleeve 21 which encircles sleeve 7 within the pillow block 2 to insure its being pivotally centered on shaft 1. This gear 20 may be fixed to the bearing 2 by means of bolts 24—24 so as to be stationary or be fixed to a governing lever arm for fixing or shifting the position of the reciprocating line of action. The idler pinion 22 located between and intermeshing with 19 and 20, controls the position of the reciprocating line of travel. This is practically set forth in my application for an improvement in cross cut saws filed November 6, 1913, Serial Number 799,420. After the mechanism is put into operation the control is not required and these gears run idly and free from strain.

My invention is designed to be variously utilized in a variety of uses where it is desirable to dispense with reciprocating connecting rods. It may be used in producing long reciprocating motions developing the highest percentage of power uniformly throughout its operation. This makes it especially useful in operating force and well pumps, hay presses, in sinking pipe wells, in operating drag saws, wind mills, etc.

It is to be observed that by shortening the crank 9 the movement may be variously changed to elongated elliptical movements suitable for drag saws where a slightly oscillating movement is desired as set forth in my application previously cited.

I am aware that prior to my invention other forms of mechanical movements have been devised whereby reciprocating movement in a right line is produced. My invention is an improvement over other forms in that I have an evenly balanced mechanism that will operate without oscillation. Other mechanisms are designed to have the crank arm or disk to revolve around a fixed gear or sprocket while my invention is operated by a central gear which, when driven, causes the accompanying mechanism to revolve around it. This novel system of operation not only develops greater power in the movements but admits of changing the proportions of the gears so as to develop any desired power or speed. These are features of my invention that do not appear to be anticipated in former mechanisms of this character.

It is to be observed that the several members of the mechanism can be so varied in size and proportion to each other as to secure any desired multiple of revolutions between shaft 1 and the oscillations of the wrist pin 11. I therefore do not limit my invention to dimensions and proportions but reserve the right to so vary the same as to best meet conditions and requirements.

It is to be observed the cross arm or disk may be varied so as to become a wheel on which the revolving reciprocating mechanism is carried, and I reserve the right to so vary and use the same in the construction of my invention as to best meet requirements.

Having described my invention, what I claim as new and desire to secure by Letters Patent is:—

1. A mechanical movement comprising a central operating shaft and gear, a sleeve mounted cross arm or disk to revolve on said central shaft, two equal sized gears oppositely mounted on said cross arm or disk and intermeshing with said central gear, a fixed pinion on the front stem of one of said oppositely mounted gears, a crank fixed to the same said oppositely mounted gear, a wrist pin on said crank, a loosely mounted gear with fixed wrist pin plate on said wrist pin, a loosely mounted idler pinion intermeshed with said fixed pinion and loosely mounted wrist pin gear, a counter weight on the other of said oppositely mounted gears so mounted as to counterbalance the crank on the first mentioned oppositely mounted gear and prevent oscillation, a fixed pinion on the rear stem of said other oppositely mounted gear, a loosely mounted idler pinion intermeshed therewith and a gear meshing with said last named pinion centrally mounted about the sleeve of the said cross arm or disk, said last named gear being fixed in such manner as to locate the direction of the line of travel of said wrist pin in its reciprocating movement as described and set forth.

2. A mechanical movement comprising a central operating shaft and gear, a sleeve mounted cross arm or disk to revolve on said central shaft, two equal sized gears oppositely mounted on said cross arm or disk, and each intermeshed with said central operating gear, a fixed pinion on the front stem of one of said oppositely mounted gears, a fixed crank on the same said oppositely mounted gear, a wrist pin on said crank, a loosely mounted gear with fixed wrist pin plate on said wrist pin, a loosely mounted idler pinion intermeshed with said fixed pinion and loosely mounted wrist pin gear, a counterweight on the other of said oppositely mounted gears so mounted as to counterbalance the crank on the first mentioned oppositely mounted gear and prevent oscillation, a fixed pinion on the rear stem of said other oppositely mounted gear, a loosely mounted idler pinion intermeshed therewith and a gear meshing with said last named pinion centrally mounted about the sleeve of the said cross arm or disk, as set forth and described, each of said equal sized oppositely mounted gears so differing from the size of the first named central operating gear that the said central operating gear will make a multiple of revolutions to develop one complete reciprocating motion of said wrist pin.

3. A mechanical movement comprising two equal sized gears, an operating wrist pin and crank, said crank fixed to one of said two equal sized gears, a central shaft and gear, said two equal sized gears oppositely mounted and meshing with said central gear, a cross arm or disk sleeve mounted on said central shaft, said cross arm or disk having said equal sized gears mounted thereon; a gear with wrist pin plate fixed thereon loosely mounted on said wrist pin, and a loosely mounted idler pinion intermeshed therewith, a pinion meshing with said intermediate gear fixed on the front stem of the first mentioned of the oppositely mounted gears, a counterweight on the other of said equal sized oppositely mounted gears so mounted as to counterbalance said crank on the first mentioned gear and prevent oscillation, a fixed pinion on the rear stem of said other oppositely mounted gear, a loosely mounted idler pinion intermeshed therewith and a gear meshing with said last named pinion centrally mounted on the sleeve of the said cross arm or disk about the shaft of the first named central gear as described, and said two equal sized oppositely mounted gears so differing in size from the first named central gear that one complete reciprocating motion of the said wrist pin will develop a multiple of revolutions in said first named central gear and shaft as described and set forth.

4. A mechanical movement comprising a central operating shaft and gear, a sleeve mounted cross arm or disk to revolve on said central shaft, two equal sized gears oppositely mounted on said cross arm or disk and each intermeshed with the said central operating gear, one of said oppositely mounted gears being loosely mounted on a stem fixed in said cross arm or disk, a fixed pinion on the front end of said fixed stem, a crank fixed on the front face of said one of the oppositely mounted gears, a wrist pin on said crank, a loosely mounted gear on said wrist pin, a wrist pin plate fixed thereto, a loosely mounted idler pinion intermeshed therewith and with the said fixed stem pinion, the other of the two said equal sized oppositely mounted gears having a fixed stem loosely mounted on the said cross arm or disk, a fixed pinion on the rear end of the said fixed stem of the said other oppositely mounted gear, a loosely mounted idler pinion intermeshed therewith and meshing with the last named pinion, a gear fixed and sleeve mounted about the said central shaft and back of and on the sleeve of said cross arm or disk, and a counterweight on the said other of the oppositely mounted gears so mounted as to counterbalance the crank on the first named of the two oppositely mounted gears and prevent oscillation when said mechanical movement is operated by its said central shaft or by its said wrist pin as set forth and described.

In testimony whereof I affix my signature in presence of two witnesses.

ANDREW G. SCHROEDER.

Witnesses:
L. H. HIGGINS,
I. H. HILL.